(12) United States Patent
Pursifull et al.

(10) Patent No.: US 10,525,845 B2
(45) Date of Patent: Jan. 7, 2020

(54) ELECTRIC VEHICLE CHARGING STATION PARKING SPOT MONITORING SYSTEM

(71) Applicant: Ford Global Technologies, LLC, Dearborn, MI (US)

(72) Inventors: Ross Dykstra Pursifull, Dearborn, MI (US); Gopichandra Surnilla, West Bloomfield, MI (US); Daniel A. Makled, Dearborn, MI (US); Mohannad Hakeem, Dearborn, MI (US); Michael McQuillen, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/660,876

(22) Filed: Jul. 26, 2017

(65) Prior Publication Data

US 2019/0031038 A1   Jan. 31, 2019

(51) Int. Cl.
| | | |
|---|---|---|
| *B60L 53/65* | (2019.01) | |
| *B60L 53/14* | (2019.01) | |
| *B60L 53/31* | (2019.01) | |
| *B60L 58/12* | (2019.01) | |
| *G06Q 30/02* | (2012.01) | |

(52) U.S. Cl.
CPC ............... *B60L 53/65* (2019.02); *B60L 53/14* (2019.02); *B60L 53/31* (2019.02); *B60L 58/12* (2019.02); *B60L 2230/16* (2013.01); *G06Q 30/0251* (2013.01)

(58) Field of Classification Search
CPC ............................. B60L 11/1846; B60L 53/65
USPC .......................................................... 320/109
See application file for complete search history.

(56) References Cited

U.S. PATENT DOCUMENTS

| | | | | |
|---|---|---|---|---|
| 9,545,853 B1* | 1/2017 | Penilla | ................... | G06Q 10/20 |
| 2011/0213656 A1* | 9/2011 | Turner | ..................... | B60L 3/12 |
| | | | | 705/14.49 |
| 2013/0073350 A1* | 3/2013 | Blustein | ................... | G08G 1/14 |
| | | | | 705/13 |
| 2014/0021908 A1* | 1/2014 | McCool | ............... | B60L 11/182 |
| | | | | 320/108 |
| 2014/0244104 A1 | 8/2014 | Tan | | |
| 2015/0149221 A1 | 5/2015 | Tremblay | | |

(Continued)

FOREIGN PATENT DOCUMENTS

| | | |
|---|---|---|
| JP | 5240765 B2 | 7/2013 |
| JP | 5439242 B2 | 3/2014 |

(Continued)

*Primary Examiner* — Jerry D Robbins
(74) *Attorney, Agent, or Firm* — Frank Lollo; Eversheds Sutherland (US) LLP (57) ABSTRACT

Method and apparatus are disclosed for electric vehicle charging station parking spot monitoring system. An example electric vehicle charging station includes a communication module, sensors, and a charge controller. The communication module communicatively couples to a vehicle parked in a parking spot associated with the charging station. The sensors monitor the parking spot. The charge controller receives identifying information and battery information from the vehicle parked in the parking spot, and when the vehicle is not eligible for charging, sends the identifying information of the vehicle to a parking enforcement authority.

16 Claims, 4 Drawing Sheets

(56) References Cited

U.S. PATENT DOCUMENTS

| | | | | |
|---|---|---|---|---|
| 2015/0239357 A1* | 8/2015 | Huntzicker | ......... | B60L 11/1809 |
| | | | | 701/22 |
| 2016/0012657 A1* | 1/2016 | Reineccius | ............ | G06Q 20/22 |
| | | | | 705/39 |
| 2016/0019492 A1* | 1/2016 | Juhasz | ........... | G06Q 10/063114 |
| | | | | 705/7.15 |
| 2016/0364658 A1* | 12/2016 | Khoo | .................. | B60L 11/1825 |

FOREIGN PATENT DOCUMENTS

| | | |
|---|---|---|
| JP | 2014063492 A | 4/2014 |
| KR | 101691559 B1 | 12/1916 |

* cited by examiner

ELECTRIC VEHICLE CHARGING STATION PARKING SPOT MONITORING SYSTEM

TECHNICAL FIELD

The present disclosure generally relates to electric vehicle charging stations and, more specifically, an electric vehicle charging station parking spot monitoring system.

BACKGROUND

Electric charging stations are often positioned in parking structures and lots to provide a charging to electric vehicle. While the number of available charging stations is increasing, typically, a parking lot or structure will only have a few parking spots that can access the charging stations. When a non-electric vehicle parks in the electric vehicle charging spots, the charging station is unused and unavailable for charging an electric vehicle. In some jurisdictions, it is unlawful to park in a parking spot designated for electric vehicles if the parked car is not an electric vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for electric vehicle charging station parking spot monitoring system. An example electric vehicle charging station includes a communication module, sensors, and a charge controller. The communication module communicatively couples to a vehicle parked in a parking spot associated with the charging station. The sensors monitor the parking spot. The charge controller receives identifying information and battery information from the vehicle parked in the parking spot, and when the vehicle is not eligible for charging, sends the identifying information of the vehicle to a parking enforcement authority.

An example method of operating a electric vehicle charging station includes monitoring, with a sensor, a parking spot associated with an electric vehicle charging station. The method also includes, in response to detecting a vehicle park in the parking sport, (a) establishing wireless communication, via a communication module, with the vehicle, (b) receiving identifying information and battery information from the vehicle via the wireless communication, (c) determining whether the vehicle is eligible for charging based on the identifying information and battery information, and (d) when the vehicle is not eligible for charging, sending the identifying information of the vehicle to a parking enforcement authority.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Electric vehicles are often charged when a driver is parked and running errands. Electric vehicle charging stations are placed in parking lots and parking structures so that the electric vehicles can be charged. Because of the limited number of parking spaces that include an electric vehicle charging station and the increasing numbers of electric vehicles, it is important to efficiently use those parking spaces. Efficiently using the parking spaces includes having an electric vehicle parked in the spot and charging as much as possible. However, when a non-electric vehicle, charged electric vehicle, or an electric vehicle that is not plugged in parks in the spot, the abilities of the charging station are wasted.

As disclosed below, the vehicle charging station advertises, via a wireless network, when it is available and monitors the vehicles parked in the parking spot. The advertisements include location information (e.g., coordinates, retail location associated with the parking spot, etc.) to assist vehicles and/or driver to find the parking spot. For example, when an autonomous electric vehicle is in a mode to look for a parking spot, the autonomous electric vehicle may use the location information to autonomously park the parking spot. As another example, a navigation system of the vehicle may populate a map with locations of nearby parking spots based on the location information.

When the charging station detects that a vehicle has parked in the corresponding parking spot, the charging station determines whether the vehicle is eligible for charging. The vehicle is eligible for parking when the vehicle is an electric vehicle and the current state of charge (SoC) of the vehicle is below a threshold. In some examples, the charging station communicates wirelessly with the vehicle to determine characteristics of the vehicle. Example characteristics include the type of the vehicle (e.g., standard, electric, hybrid, etc.), identifying information (e.g., vehicle identification number (VIN), license plate number, etc.), and battery state information (e.g., state of charge, etc.), etc. The charging station responds based on the determined characteristics. When the vehicle is not an electric vehicle, the charging station (a) wirelessly communicates a warning to the vehicle and (b) if the vehicle remains parked, transmits a message to the owner of the parking lot and/or parking enforcement authorities with identifying information and, in some examples, an image or video of the vehicle parked in the spot. When the vehicle is an electric vehicle, but the SoC is above a charging threshold, the charging station (a) wirelessly communicates a warning to the vehicle and (b) communicates a request for the vehicle to move. When the vehicle is an electric vehicle, the SoC is below the charging threshold, but the charger is not plugged into the vehicle, the charging station wirelessly communicates a reminder to the vehicle.

Figure 1:
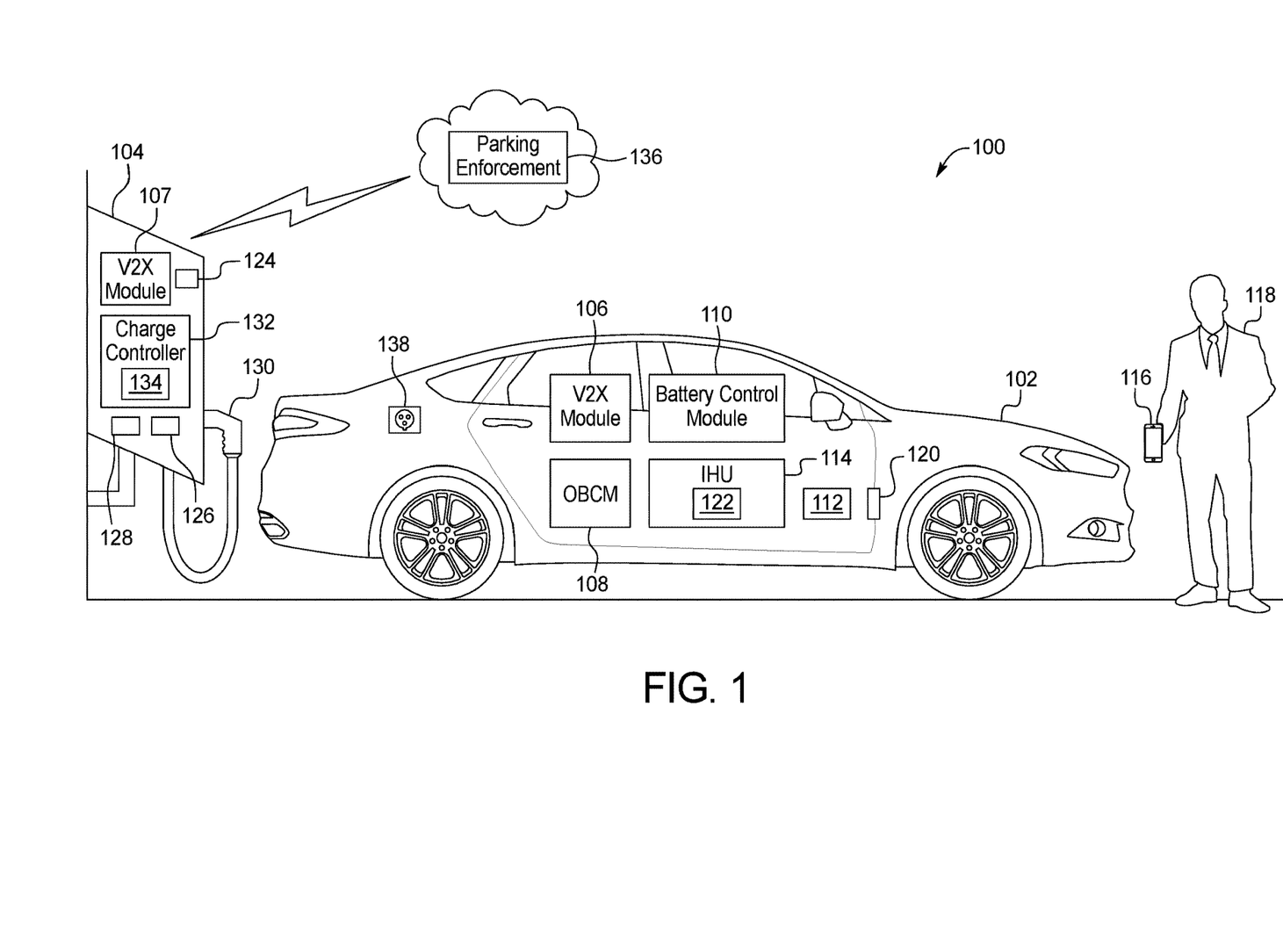
FIG. 1 illustrates a system with a electronic vehicle charging station and a vehicle operating in accordance with the teachings of this disclosure.

FIG. 1 illustrates a system 100 with a vehicle 102 and an electric vehicle charging station 104 operating in accordance with the teachings of this disclosure. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine and/or electric motor, a transmission, a suspension, a driveshaft, and/or wheels, etc. The vehicle 102 may be non-autonomous, semi-autonomous (e.g., some routine motive functions controlled by the vehicle 102), or autonomous (e.g., motive functions are controlled by the vehicle 102 without direct driver input). In the illustrated example the vehicle 102 includes a vehicle-to-everything (V2X) module 106, an on-board communications module (OBCM) 108, a battery control module 110, a body control module 112, and an infotainment head unit 114.

The V2X module 106 facilitates wireless communication between the vehicle 102 and the charging station 104. The V2X module 106 includes antenna(s), radio(s) and software to broadcast messages and to establish connections between the vehicle 102 and infrastructure-based modules (e.g., the V2X module 107 of the charging station 104), other V2X-equipped vehicles, (not shown), and mobile device-based modules (not shown). More information on the V2X network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20 (2011-06-13).pdf), which is hereby incorporated by reference in its entirety along with all of the documents referenced on pages 11 to 14 of the SyRS report. V2X systems may be installed on vehicles and along roadsides on infrastructure. V2X systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. V2X systems can be integrated with other systems such as mobile phones.

In one example, the V2X system is implemented by a dedicated short range communication (DSRC) network protocol. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The on-board communications module 108 includes wired or wireless network interfaces to enable communication with external networks. The on-board communications module 108 also includes hardware (e.g., processors, memory, storage, antenna, etc.) and software to control the wired or wireless network interfaces. In the illustrated example, the on-board communications module 108 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). The external network(s) may be a public network, such as the Internet; a private network, such as an intranet; or combinations thereof, and may utilize a variety of networking protocols now available or later developed including, but not limited to, TCP/IP-based networking protocols. In the illustrated example, the on-board communications module 108 communicatively couples to a mobile device 116 (e.g., a smart phone, a smart watch, a tablet, etc.) of as user 118 to, in some examples, send messages to the mobile device in response to the vehicle 102 receiving a message from the charging station 104.

The battery control module 110 manages charging of the battery (not shown) based on the status of the battery of the vehicle 102. The battery control module 110 monitors the parameters of the battery, such as voltage of the battery and voltages of individual battery cells, average battery temperature, the SoC, and/or current, etc. The SoC measures a percentage of the useful charge of the battery (e.g., the percentage between the peak charge voltage and the end of discharge voltage). The battery control module 110 protects the battery from over-current conditions, over-voltage conditions while charging, over-temperature conditions, and/or ground faults, etc.

The body control module 112 controls various subsystems of the vehicle 102. For example, the body control module 112 may control power windows, power locks, an immobilizer system, and/or power mirrors, etc. The body control module 112 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 112 is communicatively coupled to a door position sensor 120. The door position sensor 120 measure the position of the door (e.g., open or closed) to determine when the user 118 leaves the vehicle 102.

The infotainment head unit 114 provides an interface between the vehicle 102 and the user 118. The infotainment head unit 114 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 114 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 114 displays the infotainment system on, for example, the center console display.

In the illustrated example, the infotainment head unit 114 includes a station coordinator 122 to (a) communicate with the charging station 104 via the V2X module 106, and (b) display message on the infotainment system and/or forward messages to the mobile device 116 received from the charging station 104. The station coordinator 122 sends identifying information (e.g., license plate number, VIN, owner information, state registration information, etc.) and/or battery information (e.g., the SoC, etc.) to the charging station 104. When the vehicle 102 receives messages from the charging station via the V2X module 106, the station coordinator 122 displays the warnings via the infotainment system. In some examples, when the mobile device 116 of the user 118 is communicatively coupled (e.g., via Bluetooth®, etc.) to the vehicle 102 (e.g., via the on-board communications module 108), the station coordinator 122 forwards messages received from the charging station 104 to the mobile device 116 to be displayed on an application (e.g., FordPass, etc.) executing on the mobile device 116.

The charging station 104 provides power to electric vehicles when plugged in. Often, charging stations 104 provide this power and charge a price per kilowatt hour. In the illustrated example, the charging station 104 includes a V2X module 107, a camera 124, one or more range detection sensors 126, a power source 128, a plug 130, and a charge controller 132. The camera 124 captures images and/or video of the parking spot and any vehicle 102 parked in the parking spot. The range detection sensors 126 detect objects in the vicinity of the charging station 104. The range detection sensors 126 may include a RADAR sensor, a LiDAR sensor, a ultrasonic sensors, and/or an infrared sensor, etc. The power source 128 receives power (e.g., 200 volt/3-phase power, etc.) from a power grid and converts the power to charge electric vehicles. For example, the power source 128 may provide 120 volt/single phase power or 240 volt/split phase power. The plug 130 is configured to plug into a corresponding port of electric vehicles to electrically couple the charging station 104 and the electric vehicle. The plug 130 may conform with a standard plug interface, such as the plug configurations identified in the International Electrotechnical Commission (IEC) 62196 standard (e.g., the Society of Automotive Engineers (SAE) J1772 standard, the German Association of the Automotive Industry (VDA) VDE-AR-E 2623-2-2 standard, the EV Plug Alliance connector standard, or the CHAdeMO standard, etc.).

The charge controller 132 controls the charging of an electric vehicle and meters the charging. Additionally, the charge controller 132 includes a parking spot manager 134. The parking spot manager 134 advertises when the parking spot is available and monitors the state of the parking spot. The parking spot manager 134 determines when the parking spot is empty using the camera 124 and/or the range detection sensors 126 to detect if a vehicle 102 is parked. When the parking spot is empty, the parking spot manager 134 advertises by broadcasting an advertisement message via the V2X module 107 of the charging station 104. The advertisement message includes location information to facilitate the vehicle 102 finding the available parking space. The location information includes coordinates of the parking space, a store or parking structure associated with the parking space, and/or a parking space number, etc. In some examples, the advertisement message also includes instructions for the infotainment head unit 114 of the vehicle 102 to display/act on the information in the advertisement message when that vehicle 102 is an electric vehicle.

When the parking spot manager 134 detects the vehicle 102 via the camera 124, the range detection sensors 126, and/or the V2X module 107, the parking spot manager 134 determines whether the vehicle 102 is eligible for charging. The vehicle 102 is eligible for charging when (a) the vehicle 102 is an electric vehicle and (b) the SoC of the vehicle 102 is below a threshold charge. To determine whether the vehicle 102 is an electric vehicle and/or the SoC of the vehicle 102, the parking spot manager 134 communicatively couples with the vehicle 102 via the V2X module 107. The vehicle 102 provides identifying information (e.g., VIN, license plate number, vehicle registration, driver's license number, etc.), vehicle type information (e.g., electric vehicle, standard vehicle, hybrid vehicle, etc.), the SoC of the vehicle 102, and/or account/payment information. In some examples, when the vehicle 102 does not include the V2X module 106, the parking spot manager 134 determines that the vehicle 102 is not an electric vehicle when, after a threshold period of time after parking, the vehicle 102 is not plugged into the charging station 104.

When the vehicle 102 is not an electric vehicle, the parking spot manager 134 sends, via the V2X module 107, a warning message to the vehicle 102 to inform the user 118 that the vehicle 102 is not allowed to park in the spot and request that the vehicle 102 be moved. If the vehicle 102 is still in the parking spot after a threshold period of time, the parking spot manager 134 communicatively couples with a parking enforcement authority 136 (e.g., a police department, a parking enforcement agency, etc.) and provides the identifying information. In some such examples, the parking spot manager 134 starts a timer to compare to the threshold in response to receiving a message from the vehicle 102 that one of the doors of the vehicle 102 have been opened (e.g., as detected by the door position sensor 120 of the vehicle 102, etc.). In some examples, the parking spot manager 134 also provides an image captured by the camera 124 to the parking enforcement authority 136. In some examples, when the parking spot manager 134 is not able to obtain identifying information via the V2X module 107, the parking spot manager 134 performs license plate recognition on an image captured by the camera 124.

When the vehicle 102 is an electric vehicle, the parking spot manager 134 determines whether SoC of the battery of the vehicle 102 is above the charge threshold. In some examples, the charge threshold may be a static value (e.g., 50 percent, 75 percent, etc.) set by, for example, the owner or operator of the charging station 104. Alternatively or additionally, in some examples, the parking spot manager 134 communicates with the vehicle 102 to determine whether the SoC is sufficient to travel to a planned next destination (e.g., the home of the user 118, another store, etc.) without charging to determine whether the vehicle 102 is eligible to park in the parking spot. When the vehicle 102 is not eligible to charge, the parking spot manager 134 sends a message to the vehicle 102 to request that the user 118 move the vehicle 102. In some examples, the parking spot manager 134 repeatedly sends the message to the vehicle 102 while the vehicle 102 is parked in the parking spot. Additionally, in some examples, the parking spot manager 134 communicatively couples with the parking enforcement authority 136 and provides the identifying information of the vehicle 102.

When the vehicle 102 is an electrical vehicle and is eligible for charging, the parking spot manager 134 determines whether the plug 130 is plugged into a power port 138 of the vehicle 102. When the plug 130 is not plugged into the power port 138, the parking spot manager 134 (a) sends a message to the vehicle 102 to remind the user 118 to plug in the plug 130 into the power port 138 and (b) determines whether the user 118 is in the vicinity of the vehicle 102. In some examples, the parking spot manager 134 determines whether the user 118 is in the vicinity of the vehicle 102 by monitoring the area around the parking spot, via the camera 124 and/or the range detection sensors 126, to determine whether the user 118 is present (e.g., via motion data analysis, via image recognition, etc.). Alternatively or additionally, the parking spot manager 134 determines that the user 118 is not present when after a threshold period of time (e.g., five minutes, ten minutes, etc.). In some such examples, the parking spot manager 134 starts a timer to compare to the threshold in response to receiving a message from the vehicle 102 that one of the doors of the vehicle 102 have been opened (e.g., as detected by the door position sensor 120 of the vehicle 102, etc.). Alternatively or additionally, in some examples, the parking spot manager 134 requests the coordinates of the mobile device 116 via the vehicle 102 and/or via a server associated of an application (e.g., FordPass, etc.) executing on the mobile device 116. When the plug 130 is not plugged into the power port 138 and the user is not in the vicinity of the vehicle 102, the parking spot manager 134 sends a message to the vehicle 102 to be forwarded to the mobile device 116 reminding the user to plug in the vehicle 102. Additionally, in some examples, the parking spot manager 134 communicatively couples with the parking enforcement authority 136 and provides the identifying information of the vehicle 102.

Figure 2:
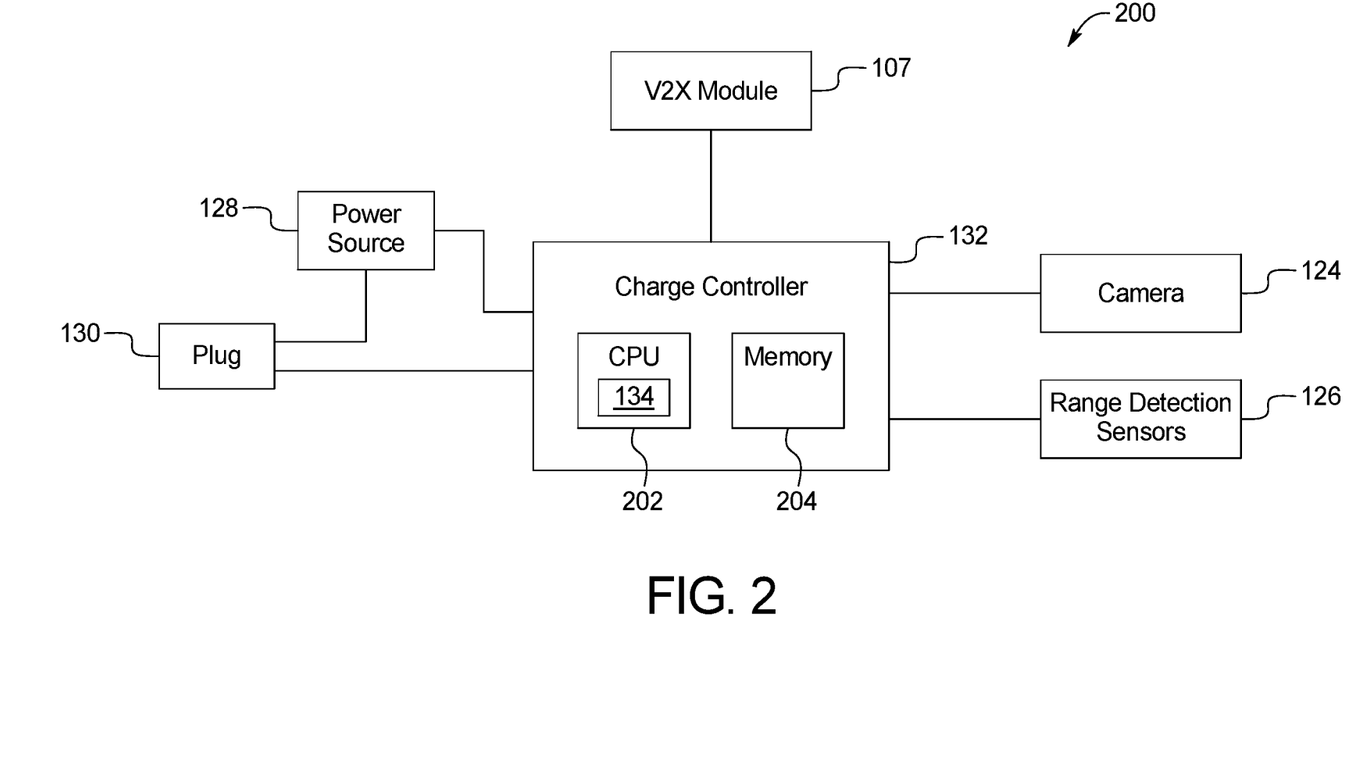
FIG. 2 is a block diagram of electronic components of the electric vehicle charging station of FIG. 1.

FIG. 2 is a block diagram of electronic components 200 of the electric vehicle charging station 104 of FIG. 1. In the illustrated example, the electronic components 200 include the V2X module 107, the camera 124, the range detection sensors 126, the power source 128, the plug 130, and the charge controller 132.

The charge controller 132 includes a processor or controller 202 and memory 204. In the illustrated example, charge controller 132 is structured to include parking spot manager 134. The processor or controller 202 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 204 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 204 includes multiple kinds of memory, particularly volatile memory and non-volatile memory.

The memory 204 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 204, the computer readable medium, and/or within the processor 202 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 3:
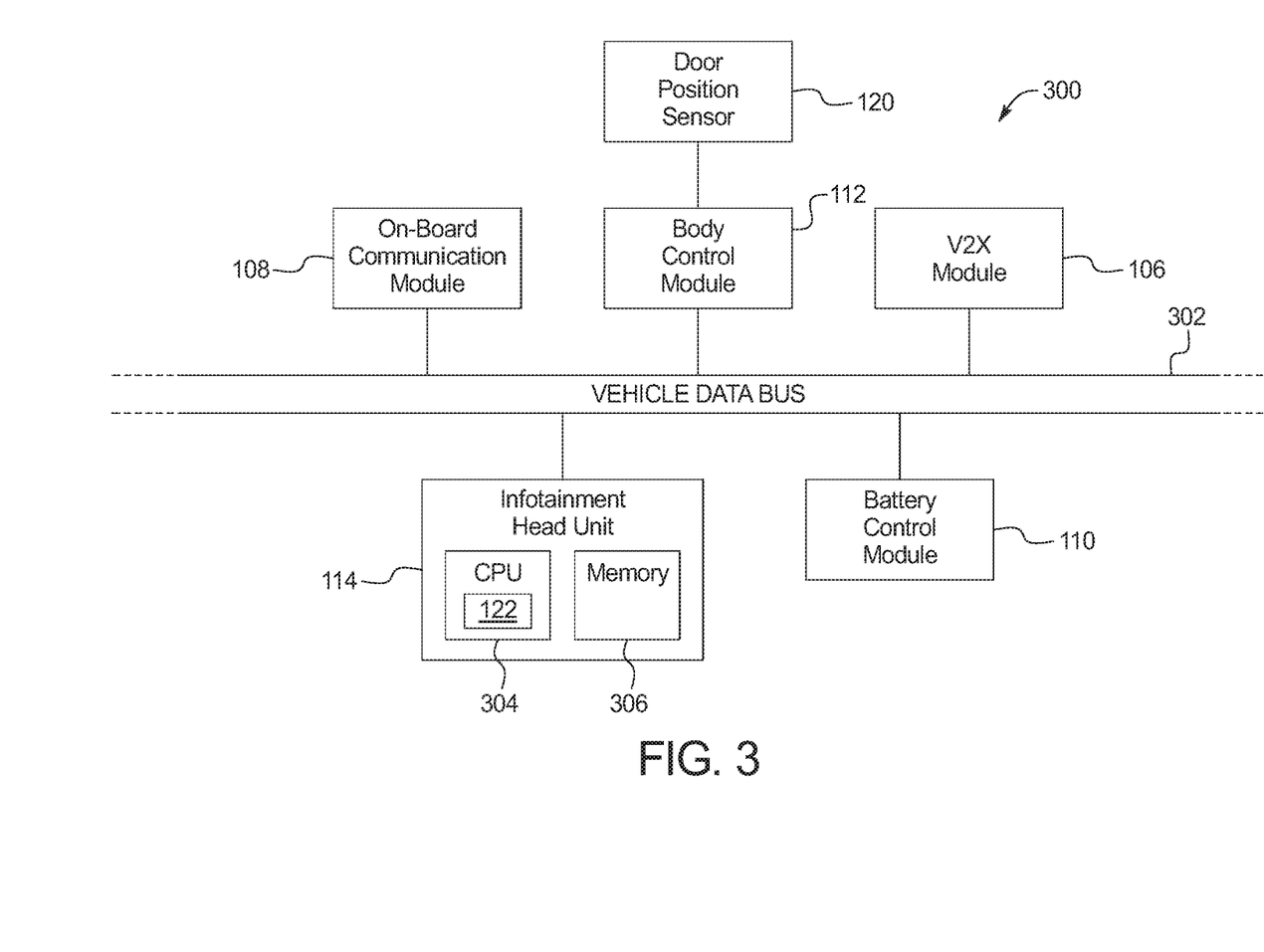
FIG. 3 is a block diagram of electronic components of the vehicle of FIG. 1.

FIG. 3 is a block diagram of electronic components 300 of the vehicle 102 of FIG. 1. In the illustrated example, the electronic components 300 include the V2X module 106, the on-board communications module 108, the battery control module 110, the body control module 112, the infotainment head unit 114, the door position sensor 120, and a vehicle data bus 302.

The infotainment head unit 114 includes a processor or controller 304 and memory 306. In the illustrated example, the infotainment head unit 114 is structured to include the station coordinator 122. The processor or controller 304 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 306 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 306 includes multiple kinds of memory, particularly volatile memory and non-volatile memory.

The memory 306 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 306, the computer readable medium, and/or within the processor 304 during execution of the instructions.

The vehicle data bus 302 communicatively couples the V2X module 106, the on-board communications module 108, the battery control module 110, the body control module 112, and the infotainment head unit 114. In some examples, the vehicle data bus 302 includes one or more data buses. The vehicle data bus 302 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
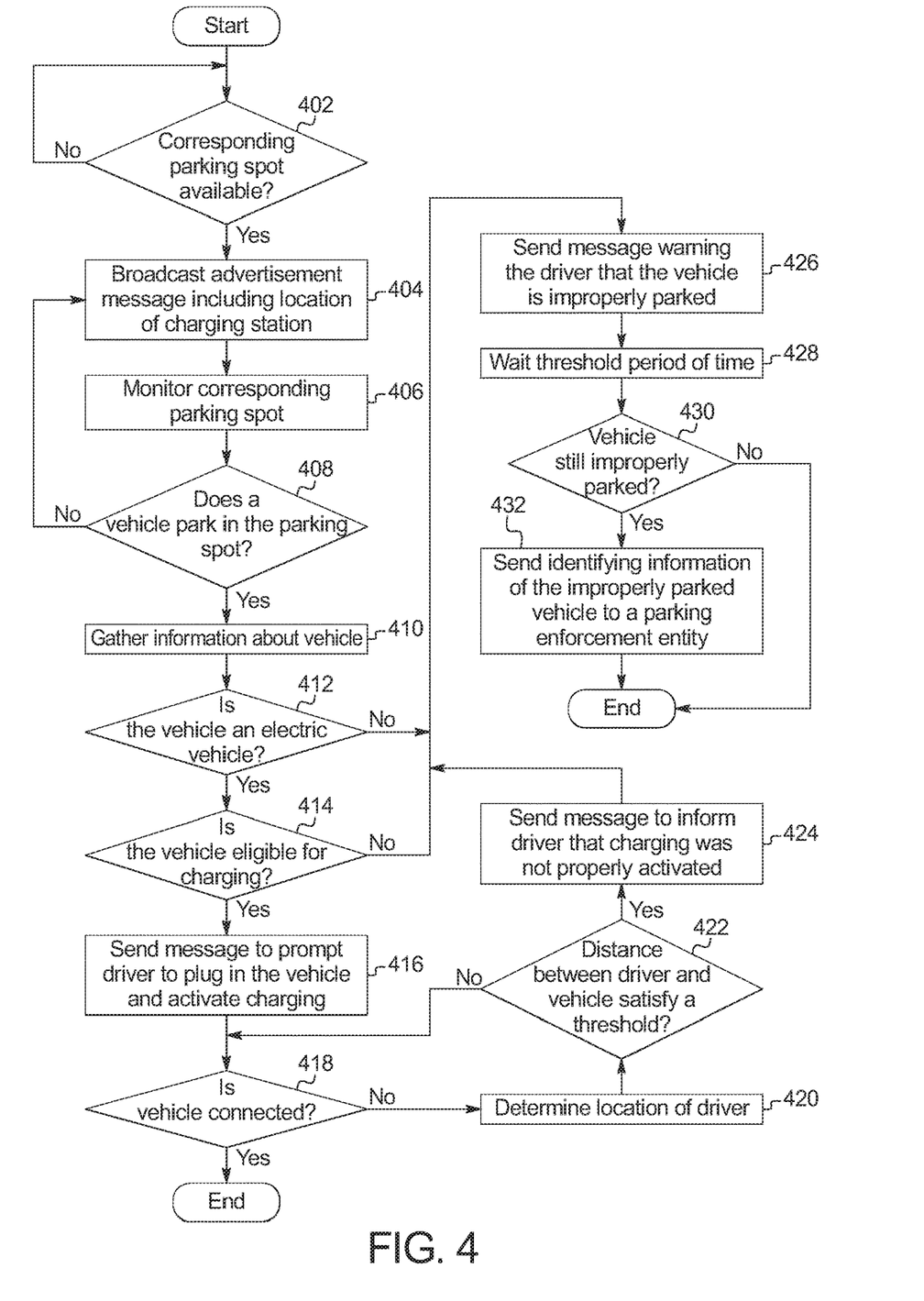
FIG. 4 is a flowchart of a method to monitor a parking spot that may be implemented by the electronic components of FIG. 2.

FIG. 4 is a flowchart of a method to monitor a parking spot that may be implemented by the electronic components 200 of FIG. 2. Initially, at block 402, the parking spot manager 134 waits until the parking spot is available. At block 404, the parking spot manager 134 broadcasts an advertisement message that includes location information for the charging station via the V2X module 107. At block 406, the parking spot manager 134 monitors the parking spot to determine when a vehicle 102 parks in the parking spot.

At block 408, the parking spot manager 134 determines whether the vehicle 102 has parked in the parking spot. When the vehicle 102 has parked in the parking spot, the method continues at block 410. Otherwise, when the vehicle 102 has not parked in the parking spot, the method returns to block 404.

At block 410, the parking spot manager 134 gathers information (e.g., identifying information, battery state information, etc.) from the vehicle 102 via the V2X module 107. At block 412, the parking spot manager 134 determines whether the vehicle 102 is an electric vehicle. When the vehicle 102 is an electric vehicle, the method continues at block 414. Otherwise, when the vehicle 102 is not an electric vehicle, the method continues at block 426. At block 414, the parking spot manager 134 determines whether the vehicle 102 is eligible for charging. In some examples, the vehicle is eligible for charging when the SoC of the battery of the vehicle 102 is less that a threshold charge. When the vehicle 102 is eligible for charging, the method continues at block 416. When the vehicle 102 is not eligible for charging, the method continues at block 426.

At block 416, the parking spot manager 134 sends, via the V2X module 107, a message to the vehicle 102 to prompt the user 118 to connect the plug 130 to the power port 138 of the vehicle 102 and activate (e.g., via a touch panel of the charging station 104, via an application executing on the mobile device 116, etc.) the charging of the vehicle 102. At block 418, the parking spot manager 134 determines whether the vehicle 102 is being charged. The vehicle 102 is not charging, for example, when the plug 130 is not connected to the power port 138 and/or the charging has not been activated on the charging station 104. At block 420, when the vehicle 102 is not charging, the parking spot manager 134 determines the location of the user 118. For example, the parking spot manager 134 may track movement in the vicinity of the vehicle 102 with the camera 124 and/or the range detection sensors 126 and/or track the location of the mobile device 116 of the user 118. At block 422, the parking spot manager 134 determines whether the distance between the user 118 and the vehicle 102 satisfies (e.g., is greater than) a distance threshold (e.g., five feet, ten feet, etc.). Alternatively or additionally, the parking spot manager 134 may receive a message, from the vehicle 102, that a key fob and/or the mobile device 116 associated with the vehicle 102 is outside the threshold distance from the vehicle 102. When the distance between the user 118 and the vehicle 102 satisfies the distance threshold, the method continues at block 424. Otherwise, when the distance between the user 118 and the vehicle 102 does not satisfy the distance threshold, the method returns to block 418. At block 424, the parking spot manager 134 sends a message to the vehicle 102 to inform the user 118 that charging was not properly activated.

At block 426, the parking spot manager 134 sends a message to the vehicle 102 warning the user 118 that the vehicle 102 is improperly parked. At block 428, the parking spot manager 134 waits a threshold period of time (e.g., five minutes, ten minutes, etc.). At block 430, the parking spot manager 134 determines whether the vehicle 102 is still improperly parked. At block 432, when the vehicle 102 is still improperly parked, the parking spot manager 134 sends the identifying information about the vehicle 102 to the parking enforcement authority 136.

The flowchart of FIG. 4 is representative of machine readable instructions stored in memory (such as the memory 204 of FIG. 2) that comprise one or more programs that, when executed by a processor (such as the processor 202 of FIG. 2), cause the charging station 104 to implement the example parking spot manager 134 of FIGS. 1 and 2. Further, although the example program(s) is/are described with reference to the flowchart illustrated in FIG. 4, many other methods of implementing the example parking spot manager 134 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An electric vehicle charging station comprising:
   a communication module to communicatively couple to a vehicle parked in a parking spot associated with the charging station;
   sensors to monitor the parking spot; and
   a charge controller configured to:
      determine that a user of the vehicle is positioned at or greater than a predetermined distance from the vehicle;
      gather identifying information and battery information from the vehicle parked in the parking spot;
      determine the vehicle is not eligible for charging; and
      send, based on the determination that the user is positioned at or greater than a predetermined distance from the vehicle and the determination that the vehicle is not eligible for charging, the identifying information of the vehicle to a parking enforcement authority.

2. The electric vehicle charging station of claim 1, wherein the charge controller is further configured to:
   determine the vehicle is an electric vehicle;
   determine a state of charge of a battery of the vehicle is less than a charge threshold; and
   determine, based on the determination that the vehicle is an electric vehicle and the determination that the state of charge is less than a charge threshold, that the vehicle is eligible for charging.

3. The electric vehicle charging station of claim 2, wherein the charge controller is further configured to:
   determine, that a plug of the charging station is not connected to a power port of the vehicle.

4. The electric vehicle charging station of claim 3, wherein the charge controller is further configured to:
send, based on the determination that the plug is not connected to the power port of the vehicle, a message to the vehicle to provide an alert to connect the vehicle to the charging station.

5. The electric vehicle charging station of claim 3, wherein the charge controller is further configured to:
determine the plug of the charging station not connected to the power port of the vehicle after a threshold period of time;
determine the user is at least the threshold distance from the vehicle; and
send, based on the determination that the plug of the charging station is not connected to the power port of the vehicle and the determination that the user is at least a threshold distance from the vehicle, the identifying information of the vehicle to the parking enforcement authority.

6. The electric vehicle charging station of claim 1, wherein the sensors include at least one of a camera or a range detection sensor.

7. The electric vehicle charging station of claim 1, wherein the charge controller is further configured to:
determine the vehicle is an electric vehicle;
determine a state of charge of a battery of the vehicle is greater than a charge threshold;
determine, based on the determination that the vehicle is an electric vehicle and the determination that the state of charge of the battery is greater than a charge threshold, that the vehicle is not eligible for charging; and
send, based on the determination that the vehicle is not eligible for charging, a message to the vehicle requesting the vehicle move.

8. The electric vehicle charging station of claim 1, wherein one of the sensors is a camera, and wherein the charge controller is further configured to retrieve, based on a determination that the communication module cannot communicatively couple to the vehicle, identifying information of the vehicle via the camera.

9. A method of operating a electric vehicle charging station comprising
monitoring, with a sensor, a parking spot associated with an electric vehicle charging station;
in response to detecting a vehicle park in the parking spot:
determining that a user of the vehicle is positioned at or greater than a predetermined distance from the vehicle;
establishing, via a communication module, wireless communication with the vehicle;
receiving, via the communication module and from the vehicle, identifying information and battery information;
determining, with a processor, the vehicle is not eligible for charging based on the identifying information and battery information; and
sending, based on the determination the vehicle is not eligible for charging and the determination that the user is positioned at or greater than a predetermined distance from the vehicle, an indication to the user.

10. The method of claim 9 further comprising:
determining the vehicle is an electric vehicle;
determining a state of charge of a battery of the vehicle is less than a charge threshold; and
determining, based on the determination that the vehicle is an electric vehicle and the determination that the state of charge is less than a charge threshold, that the vehicle is eligible for charging.

11. The method of claim 9 further comprising: determining that a plug of the charging station is not connected to a power port of the vehicle.

12. The method of claim 11 further comprising: sending, based on the determination that the plug of the charging station is not connected to the power port of the vehicle and after a threshold period of time, the identifying information of the vehicle to the parking enforcement authority.

13. The method of claim 9 further comprising:
sending, based on the determination that the vehicle is an electric vehicle and the determination that a state of charge of a battery of the vehicle is greater than a charge threshold, a message to the vehicle requesting that the vehicle move to a new location.

14. The method of claim 9 further comprising:
retrieving, via a camera and based on a determination that the communication module cannot communicatively couple to the vehicle, identifying information of the vehicle.

15. The method of claim 9 further comprising:
broadcasting, via the communication module and based on a determination that the parking spot is empty, an advertisement message including location information of the charging station.

16. An electric vehicle charging station comprising:
a communication module to communicatively couple to a vehicle parked in a parking spot associated with the charging station;
sensors to monitor the parking spot; and
a charge controller configured to:
track a location of a user of the vehicle;
gather identifying information and battery information from the vehicle parked in the parking spot;
determine the vehicle is eligible for charging;
determine the vehicle is not electrically coupled to the charging station for charging;
determine the user is positioned at or greater than a predetermined distance from the vehicle; and
send, based on the determination that the vehicle is eligible for charging, the determination that the vehicle is not electrically coupled to the charging station, and the determination that the user is positioned at or greater than a predetermined distance from the vehicle, the identifying information of the vehicle to a parking enforcement authority.

\* \* \* \* \*